Sept. 5, 1967 D. H. WEITZEL 3,339,948
PIPE COUPLING
Filed June 25, 1965 2 Sheets-Sheet 2
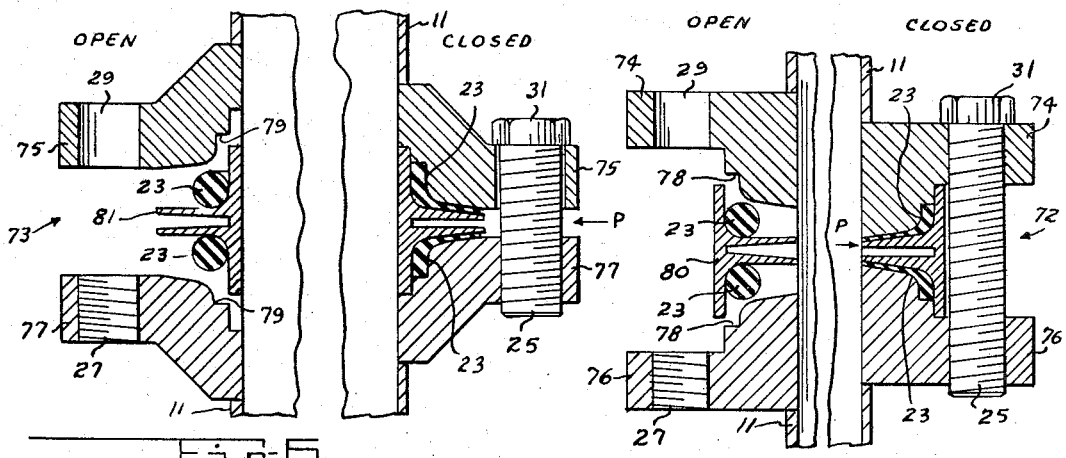
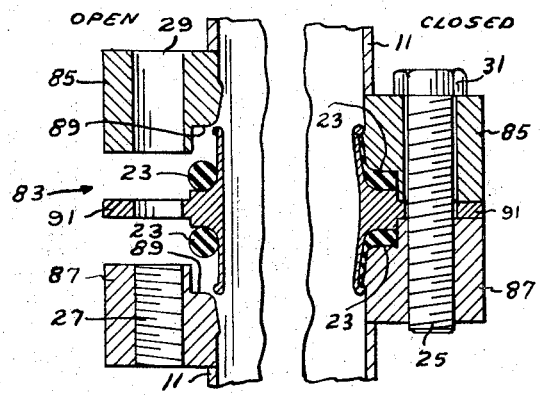
INVENTOR
DANIEL H. WEITZEL
BY Harry A. Herbert Jr
ATTORNEY
Richard J. Killoren
AGENT

# United States Patent Office 3,339,948
Patented Sept. 5, 1967

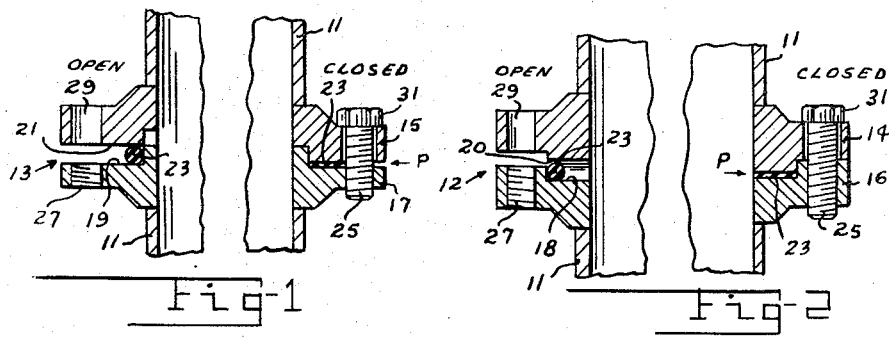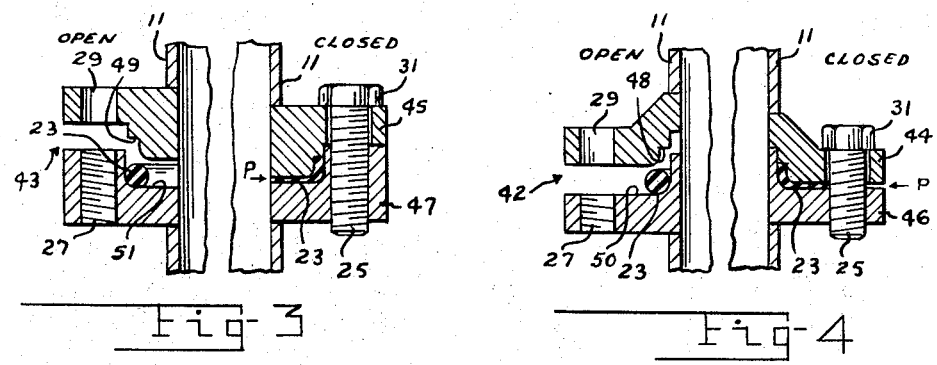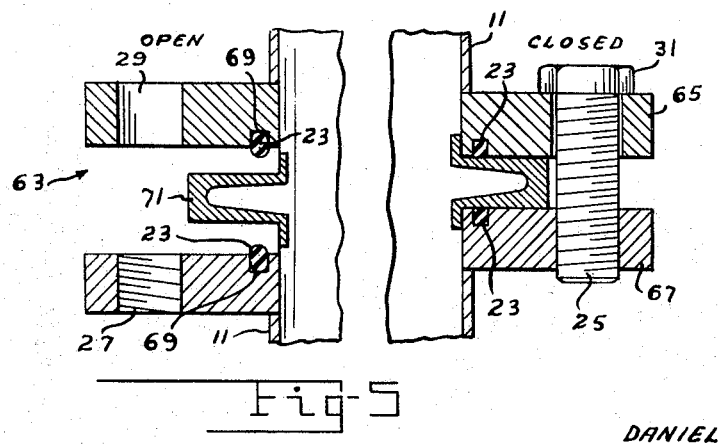

3,339,948
PIPE COUPLING
Daniel H. Weitzel, Boulder, Colo., assignor to the United States of America as represented by the Secretary of the Air Force
Filed June 25, 1965, Ser. No. 467,150
6 Claims. (Cl. 285—331)

ABSTRACT OF THE DISCLOSURE

A low temperature resistant sandwich configuration O-ring seal compressed between a pair of opposing flanges of a pipe joint coupled by a plurality of bolts. Dimensioned stepped surfaces incorporated on the inside of the flanges engage and compress the O-ring seal with an increased net compression force into a thin layer of sealing material extruded into a sealing space provided to seal the pipe joint even at cryogenic temperatures.

---

The invention described herein may be used by or for the United States Government for governmental purposes without payment to me of any royalty thereon.

This invention relates to seals and more particularly to elastomeric O-ring static seals for use in cryogenic equipment.

Elastomeric O-ring seals enjoy unparalleled and well deserved popularity in almost every area of science and technology.

The use of elastomer seals in pipe joints and pipe covers has been found to be very satisfactory at ordinary temperatures as demonstrated by the widespread acceptance of this type seal.

Elastomers have properties which make them ideal for numerous seal applications. The requirement that a seal remain tight when cycled between room temperature (or higher) and temperatures below −150° F. may, however, be considered extraordinary. Very few solids experience more drastic property changes over this temperature interval than do elastomeric polymers. It has often been assumed, therefore, that elastomers are not suitable seal materials for cryogenic temperature applications.

The contraction of the elastomer seal between room temperature and a cryogenic temperature (lower than −150° F.) will normally be much greater than that of the flange material. Thus it is possible for an O-ring to actually shrink away from the surface of the flange supporting it, leaving a gap instead of a seal.

The present invention demonstrates that elastomeric O-rings offer a simple and reliable solution to cryogenic temperature sealing problems.

The object of this invention is to provide a seal that is efficient and reliable when cycled between room temperature (or higher) and temperatures approaching absolute zero (−459° F.).

Two essential parts of a mechanical pipe coupling are: (1) a conformable material which flows under pressure and (2) a mechanical fastener for applying force and holding the coupling together.

The sealing integrity depends on the conformable material and a sealing pressure which forces the conformable material into intimate contact with the flange surface irregularities.

Elastomeric polymers are unique materials which behave in a characteristic manner at room temperature (where the seal is made) and in an entirely different manner at cryogenic temperatures (where the seal is expected to maintain good performance).

Since the contraction rate of the brittle elastomer is several times as high as that of the confining flanges, temperature changes which occur below the brittle transition temperature $T_g$ (approximately −150° F.) will introduce thermal strains parallel to the flange surfaces, and may even cause lateral motion or sliding along the interface. Relative motion at the interface will result in "unseating" of the seal unless there is a plastic flow or deformation to prevent this. A "sandwich" configuration consisting of two foil or film washers with the O-ring between may be used to help prevent the relative motion and unseating of the seal. The foil or film washer may consist of polytetrafluoroethylene, lead, aluminum, or indium. A three mil thick indium foil proved to be highly successful when used in this way. The elastomer indium "sandwich" makes effective use of indium's ability to cold flow. A very thin layer of indium remains compressed between the elastomer and the flange surface and continuously fills any openings which tend to form as the surfaces move relative to one another. In this way, indium functions as an O-ring lubricant or grease, but one which does not become brittle at cryogenic temperatures. The advantage over plain indium is that there is no continuous cold flow because of frictional forces on the extremely thin layer of indium which remains between the flange and O-ring. In addition, each time the elastomer warms to its brittle point, it comes to life like a compressed spring and reseats the seal.

There are certain principles to be employed in the use of static elastomeric O-ring seals at cryogenic temperatures.

Among them are:

(1) Choose an elastomer which can be given between 80 and 90 percent linear compression without material failure. Such an elastomer is natural rubber, neoprene, polybutadiene, ethylacrylate, vinylidene fluoride perfluoropropylene, chlorosulfonated polyethylene, vinyl pyridine-acrylonitrile, and butadiene-acrylonitrile.

(2) Compress the thickness or cross section diameter of the elastomer between 80 and 90 percent. Select an elastomer with cross section that will give a final compressed thickness no greater than 0.010 inch.

(3) Spring load the compressed elastomer, or use the pressure of the confined fluid, or take advantage of differential thermal contraction (or use two or all of these) to maintain a net sealing pressure of about 5000 p.s.i. on the sealing area.

(4) Lubricate the interface between the elastomer and each flange or metal spring insert with a thin layer of indium. This will reduce the relative motion between the seal and the interface and will allow the net sealing pressure to be reduced to as little as 1500 p.s.i.

The amount the elastomer is compressed is critical, i.e., between 80 and 90%. Likewise, the final compressed thickness of the elastomer is critical, i.e., approximately 0.010 inch.

Other objects and advantages will become apparent from the folowing detailed description of the present invention taken in connection with the accompanying drawings wherein:

FIG. 1 is a section view of a stepped flange pipe joint showing the elastomer in the compressed and uncompressed condition. The particular configuration is for external pressure on the pipe or for a vacuum within the pipe.

FIG. 2 is a section view of a stepped flange pipe joint for internal pressure showing the elastomer in the compressed and uncompressed condition. The particular configuration is for internal pressure within the pipe.

FIG. 3 is a section of a stepped flange pipe joint for internal pressure which can be dimensioned to apply high compression to any desirable fraction of the O-ring cross section showing the elastomer in the compressed and uncompressed condition.

FIG. 4 is a section view of a stepped flange pipe joint for external or vacuum pressure which can be dimensioned to apply high compression to any desirable fraction of the O-ring cross section showing the elastomer in the compressed and uncompressed condition.

FIG. 5 is a section view of a flange pipe joint and metal spring insert assembly for spring loading the seal which uses two O-rings showing the elastomer in the compressed and uncompressed condition.

FIG. 6 is a section view of a flange pipe joint and metal spring insert assembly for tucking away part of the cross section of the O-ring and applying a controlled spring load to the remainder of the O-ring which is used to make the seal. The particular configuration is for external pressure. The elastomer is depicted in the compressed and uncompressed condition.

FIG. 7 is a section view of a stepped flange pipe joint and metal spring insert assembly for tucking away part of the cross section of the O-ring and applying a controlled spring load to the remainder of the O-ring which is used to make the seal. The particular configuration is for internal pressure. The elastomer is depicted in the compressed and uncompressed condition.

FIG. 8 is a section view of a counterbored flange pipe joint and metal spring insert assembly which spring loads the elastomer through hoop compression of the ring-shaped insert. This design utilizes the mechanical advantage of an inclined plane to compress the insert ring and elastomer. The elastomer is depicted in the compressed and uncompressed condition.

FIG. 9 is an exploded perspective view of an elastomer sandwich seal configuration consisting of two foil or film washers with the elastomer O-ring between.

Referring more particularly to the drawings, FIG. 1 shows pipes 11 adapted to be secured at their ends to the stepped flange assembly designated generally as 13. The flange assembly comprises an upper flange member 15, and a mating lower flange member 17. The lower flange member 15 has an annular step 19 which receives the elastomer O-ring seal 23. The O-ring seal 23 is positioned adjacent the annular step 19 in lower flange member 17. The upper flange member 15 has an annular step 21 which is adapted to engage in mating relationship with the annular step 19 on lower flange member 17. The bolts 25 are attached to lower flange member 17 around the periphery thereof by means of threaded holes 27. Clearance apertures 29 can be used in both flanges and the bolts secured with nuts (not shown in drawing). The bolts and flanges apply a compressive force on the O-ring seal 23.

The seal is assembled by connecting pipe 11 to flanges 15 and 17, placing the O-ring seal 23 in the annular step 19 on lower flange member 17, placing the upper flange member 15 on bolts 25 protruding from lower flange member 17, and applying a predetermined torque to nut 31 to linearly compress the elastomer O-ring between 80 and 90% of its original cross sectional diameter and also compress the elastomer O-ring so that the final compressed cross section thickness of the O-ring is no greater than 0.010 inch. The design shown in FIG. 1 is used particularly for external pressure.

FIG. 2 shows pipes 11 adapted to be secured at their ends to the stepped flange assembly designated generally as 12. The flange assembly comprises an upper flange member 14, and a mating lower flange member 16. The lower member 16 has an annular step 18 which receives the elastomer O-ring seal 23. The O-ring seal 23 is positioned adjacent the annular step 18 in lower flange member 16. The upper flange member 14 has an annular step 20 which is adapted to engage in mating relationship with the annular step in lower flange member 16.

The seal is assembled in a manner similar to that discussed for assembling the seal in FIG. 1. The design shown in FIG. 2 is particularly adapted for internal pressure.

FIG. 3 shows pipes 11 adapted to be secured at their ends to the stepped flange assembly designated generally as 43. The flange assembly 43 comprises an upper flange member 45 and a lower flange member 47. The upper flange member 45 has an annular step 49. The lower flange member 47 has an annular fillet 51 which receives the elastomer O-ring seal 23. The O-ring 23 is positioned adjacent annular fillet 51 in lower flange member 47.

The seal is assembled in a manner similar to that described for assembling the seal in FIG. 1. This particular stepped flange design can be dimensioned to apply high compression to any desirable fraction of the O-ring cross section.

The design shown in FIG. 3 is particularly adapted for internal pressure.

FIG. 4 shows pipes 11 adapted to be secured at their ends to the stepped flange assembly designated generally as 42. The flange assembly 42 comprises an upper flange member 44 and a lower flange member 46. The upper flange member 44 has an annular step 48. The lower flange member 46 has an annular fillet 50 which receives the elastomer O-ring seal 23. The O-ring 23 is positioned adjacent annular fillet 50 in lower flange member 46.

The seal is assembled in a manner similar to that described for assembling the seal in FIG. 1. This particular stepped flange design can be dimensioned to apply high compression to any desirable fraction of the O-ring cross section. The design shown in FIG. 4 is particularly adapted for external pressure.

FIG. 5 shows pipes 11 adapted to be secured at their ends to the flange assembly designated generally as 63. The flange assembly comprises two identical flange members; upper flange member 65 and lower member 67. Th eflange members 65 and 67 each have identical opposing annular grooves 69. Each annular groove 69 is adapted to receive an O-ring 23.

A metal spring insert assembly 71 is adapted to be placed between the upper flange member 65 and a first O-ring 23 and the lower flange member 67 and a second O-ring 23.

The seal is assembled in a manner similar to that described for assembling the seal in FIG. 1.

FIG. 6 shows pipes 11 adapted to be secured at their ends to the flange assembly designated generally as 73. The flange assembly comprises two identical flange members; upper flange member 75 and lower flange member 77. The flange members 75 and 77 each have identical opposing annular steps 79. A metal spring insert assembly 81 is adapted to be placed between the upper flange member 75 and the lower flange member 77. A first O-ring 23 is placed between upper flange member 75 and the metal spring insert assembly 81. A second O-ring 23 is placed between lower flange member 77 and the metal spring insert assembly 81.

The seal is assembled in a manner similar to that described for assembling the seal in FIG. 1.

The design shown in FIG. 6 is particularly adapted for external pressure.

FIG. 7 shows pipes 11 adapted to be secured at their ends to the flange assembly designated generally as 72. The flange assembly comprises two identical flange members; upper flange member 74 and lower flange member 76. The flange members 74 and 76 each have identical opposing annular steps 78. A metal spring insert assembly 80 is adapted to be placed between the upper flange member 74 and the lower flange member 76. A first O-ring 23 is positioned between upper flange member 74 and the metal spring insert assembly 80. A second O-ring 23 is positioned between lower flange member 76 and the metal spring insert assembly 80.

The seal is assembled in a manner similar to that described for assembling the seal in FIG. 1.

The design shown in FIG. 7 is particularly adapted for internal pressure.

FIG. 8 shows pipes 11 adapted to be secured at their ends to the flange assembly designated generally as 83. The flange assembly comprises two identical flange members; upper flange member 85 and lower flanger member 87. The flange members 85 and 87 each have identical opposing counterbores 89. A metal spring insert 91 is adapted to be placed between the upper flange member 85 and the lower flange member 89. An O-ring 23 is placed between upper flange member 85 and the metal spring insert assembly 91. An O-ring 23 is placed between lower flange member 87 and the metal spring insert assembly 91.

The seal is assembled in a manner similar to that described for assembling the seal in FIG. 1.

FIG. 9 shows an elastomer sandwich seal 24 consisting of two foil or film washers 22 with the elastomer O-ring 23 between the foil washers 22.

While in the above detail description of FIGS. 1 through 8 the term O-ring 23 has been used for simplicity, it is to be understood that in each instance that the O-ring 23 could be used alone or the elastomer sandwich seal configuration 24 consisting of two foil or film washers 22 with the elastomer O-ring 23 between could be used as shown in FIG. 9. If the sandwich seal configuration 24 is used the flange loading is reduced by a factor of three and a more reliable seal is obtained.

It is to be understood that this invention is not limited to the specific embodiment shown and described, but that various alterations and modifications may be made without departing from the spirit and scope of this invention as claimed.

I claim:

1. A coupler for interconnecting the ends of pipes which carry gas or liquid at temperatures below −150° F. comprising:
   (a) a flange assembly adapted to be secured to the pipe ends to be coupled, said flange assembly including an upper flange member and a lower flange member, said upper flange member incorporating a first, force-transmitting annular step means in operable relation with a second, force-transmitting annular step means in said lower flange member, at least one of said annular step means incorporating an extended extrusion space portion adapted to receive extruded sealing material therein and force-transfer means for subsequently applying a compression force initially applied to couple said flange assembly to said sealing material;
   (b) elastomer O-ring seal means constrained in initial uncompressed condition between said upper and lower flange members; and
   (c) means for initially applying a predetermined coupling force to said flange assembly to move the upper and lower flange members into a coupled position, the force-transfer means of said annular step means thereby moving to a seal-engaged position and being dimensioned relative to the coupled position of said flange members to thereby apply a relatively high compression force to compress said O-ring seal into a thin layer of elastomeric sealing material extruding into the extrusion space provided therefor a predetermined extent sufficient to overcome the inherent unseating of the seal at cryogenic temperatures.

2. A coupler as in claim 1, wherein said first-named annular step means incorporates a projecting flat portion engageable in mating relationship in a recessed flat portion of said second-named annular step means forming an extrusion space portion adapted to receive extruded sealing material therein, and said O-ring seal comprises a combined indium-elastomer sandwich configuration of relatively small cross section constrained in initial uncompressed relation in said lower annular step means recessed flat portion, said coupling force means moving said upper flange member and annular step means in coupled relation to said lower flange member and recessed portion to initially compress the cross section of said combined indium-elastomer O-ring seal into said extrusion space at normal temperatures and subsequently leaving an extremely thin layer of extruded indium extending into, and lubricating said extrusion space by plastic flow to both act as, and maintain the seal of the coupled pipe ends during inherent contraction of the elastomer portion of the seal at cryogenic temperatures.

3. A coupler as in claim 1, wherein said flange assembly comprises a lower flange member having an elongated flat step portion adapted to receive said O-ring elastomer seal being in constrained relation therein, and an upper flange member having a double annular step configuration incorporating a first, dimensioned step portion adapted to apply relatively high compression only to a predetermined fraction of the O-ring cross section and inclined relative to the axis of the coupler to provide a partially radial force magnifying the initial coupling force applied to the flange assembly to thereby increase the net compression force on the seal, and a second, flat step portion contiguous to said inclined portion and dimensioned both to provide space for a first, relatively uncompressed portion of the seal cross section and to provide spring loading to a second, highly compressed portion of the seal by initial flexing of the upper and lower flange members during coupling movement thereof to the seal-compressed position prior to final metal-to-metal contact between the flange members.

4. A coupler as in claim 1, said upper and lower flange members having a pair of identical opposing annular step portions, said elastomer O-ring seal being in engagement in compressed condition in each of said annular step portions, and independently-mounted spring-loading means adapted to provide a controlled spring load to a highly compressed portion only of each O-ring seal when said upper and lower flange members are moved to their coupled position, each of said annular step portions being dimensioned to provide a radially-disposed portion having an enlarged space adapted to receive a relatively uncompressed portion of a corresponding O-ring seal, and a relatively restricted space adapted to receive and apply a magnified force to the highly compressed portion of the seal.

5. A coupler as in claim 4, said spring-loading means comprising oppositely-disposed, raised annular portions receiving said O-ring seals initially in uncompressed and constrained relation thereagainst, and relatively elongated flexible beam members disposed in slightly divergent relation when said flanged members are in uncoupled condition and flexed to substantially parallel relation to highly compress and spring load a portion of said O-ring seals on movement of said flange members to their coupled condition.

6. A coupler as in claim 4, the force transmitting annular step means of said upper and lower flange members comprising a pair of counterbores having a first portion dimensioned to control the application of relatively high compression to a predetermined portion only of the cross section of said elastomer O-ring seals and a second inclined portion adapted and dimensioned to assist in both applying and maintaining a predetermined spring load on said O-ring seals when in their compressed condition, and said spring loading means comprising a ring shaped metallic spring insert adapted to be positioned between said upper and lower flange members to further provide an extrusion space to receive a relatively uncompressed portion of each O-ring seal, and having oppositely disposed, relatively elongated flexure members adjoined thereto and flexed by the inclined portion of the annular step means of each of said upper and lower flange members on movement of said flange members to the coupled condition to thereby highly compress a portion of each seal between said annular step means inclined portion and said flexure members, said upper flange member inclined portion applying a compression load to the seal multiplied over the coupling load on the flange assembly.

(References on following page)

References Cited
UNITED STATES PATENTS

| | | | |
|---|---|---|---|
| 2,578,056 | 12/1951 | French | 285—363 |
| 2,681,816 | 6/1954 | Smith | 285—363 |
| 3,012,802 | 12/1961 | Waite | 285—363 |
| 3,103,366 | 9/1963 | Dunn | 277—188 |
| 3,142,344 | 7/1964 | Otteman et al. | 285—363 |
| 3,158,380 | 11/1964 | Carrell et al. | 285—363 |
| 3,285,631 | 11/1966 | Stolpmann | 285—416 |

CARL W. TOMLIN, *Primary Examiner.*

W. L. SHEDD, *Assistant Examiner.*